June 9, 1964 W. L. ANDERSON 3,136,381
DIRECTED ACOUSTIC VELOCITY LOGGING
Filed May 3, 1960 2 Sheets-Sheet 1

INVENTOR.
Warren L. Anderson
BY
James M. Pepper
AGENT

June 9, 1964  W. L. ANDERSON  3,136,381
DIRECTED ACOUSTIC VELOCITY LOGGING
Filed May 3, 1960  2 Sheets-Sheet 2
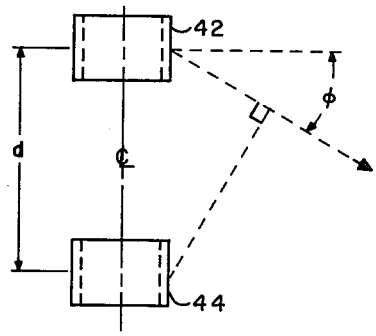
FIG. 7
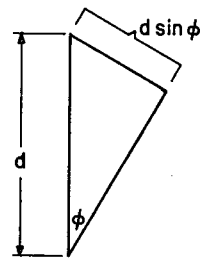
FIG. 8
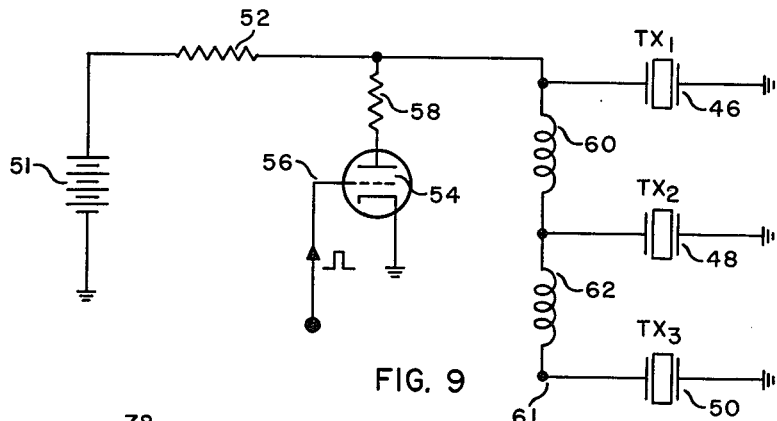
FIG. 9
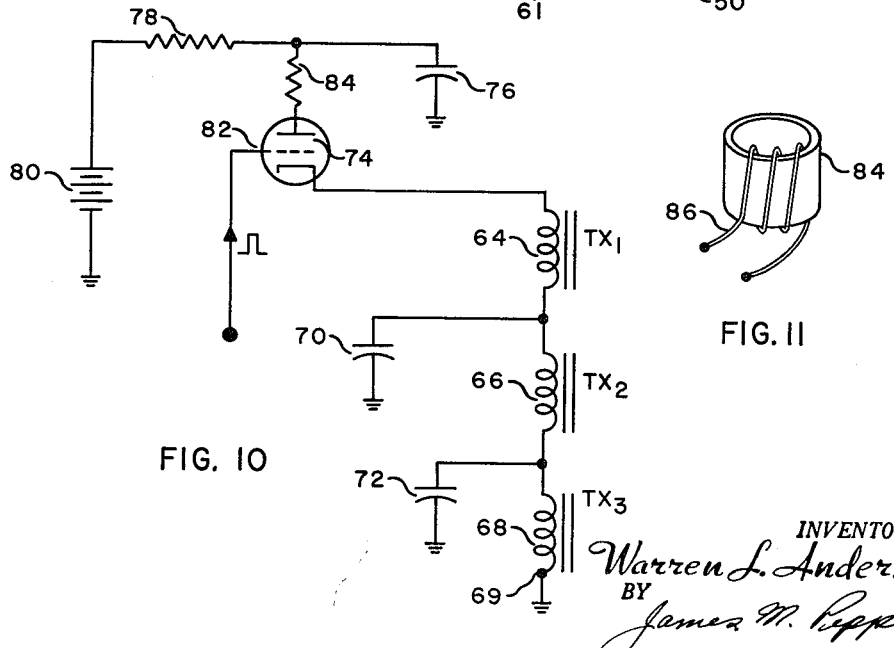
FIG. 10
FIG. 11
INVENTOR.
Warren L. Anderson
BY James M. Peppers
AGENT

United States Patent Office 3,136,381
Patented June 9, 1964

3,136,381
DIRECTED ACOUSTIC VELOCITY LOGGING
Warren L. Anderson, Bacliff, Tex., assignor to Halliburton Company, a corporation of Delaware
Filed May 3, 1960, Ser. No. 26,610
8 Claims. (Cl. 181—.5)

This invention relates to well logging systems and more particularly to improved acoustic velocity well logging systems.

Acoustic velocity well logging presently makes use of a transmitting transducer and one or more receiving transducers suspended in a well bore, shown in Reissue No. 24,446 to G. C. Summers, for example. A discrete pulse of high frequency sound is emitted by the transmitter transducer which travels through the bore hole fluid and adjacent earth formations to one or more receiving transducers. The transit time of the acoustic pulse through the formation has been found to correlate with certain characteristics of the earth strata through which it passes.

A commonly used configuration for the transducers is in the form of a thin cylinder whose axis is concentric with the axis of the logging tool. Commonly, electrostrictive or magnetostrictive materials are used in manufacturing the transducers. With such materials, acoustic energy is transmitted and received most efficiently in a direction normal to the cylindrical surface. Consequently, the commonly used tool configuration is most suited for the transmission and reception of acoustic signals horizontally with respect to the logging tool.

If the earth formations are of materials and porosity such that the formation acoustic velocity is relatively low, the angle of the signal path with the horizontal may be relatively large. For this reason a substantial loss of received signal strength occurs in low velocity formations with a consequent reduction of well log quality. A further reduction in the strength of a received signal occurs when the transmitter transducer is emitting most of its energy in a horizontal direction with only a small portion of the energy leaving in a direction suitable for interception (reception) by the receivers.

It is therefore a general object of this invention to provide method and apparatus for directing acoustic energy pulses through earth formations traversed by a well bore.

A further object of this invention is to provide acoustic transmitter and receiver transducer configurations to yield maximum signal strength in earth formations of low acoustic velocity characteristic.

A more specific object of this invention is to provide an electrical analog of a mechanical transducer assembly for accomplishing the purposes outlined above.

A further object is to provide method and apparatus for reducing interference caused by spurious noise of a random nature by use of directionally sensitive receiver transducers which are responsive only to acoustic energy arriving from a prescribed direction through adjacent earth formation.

These and other objects of this invention are further illustrated by reference to the following complete description taken in reference to the accompanying drawings in which:

FIGURE 1 schematically shows a transducer configuration in current prevailing use;

FIGURE 7 illustrates the physical principle employed in the electrical analog embodiment;

FIGURE 8 is a vector diagram related to FIGURE 7;

FIGURE 9 is a schematic embodiment of a circuit diagram utilizing electrostrictive transducers in a directional manner;

FIGURE 10 shows another schematic embodiment of a circuit diagram where magnetostrictive transducers are used in a directional manner;

FIGURE 11 shows a magnetostrictive type transducer.

Figure 1:
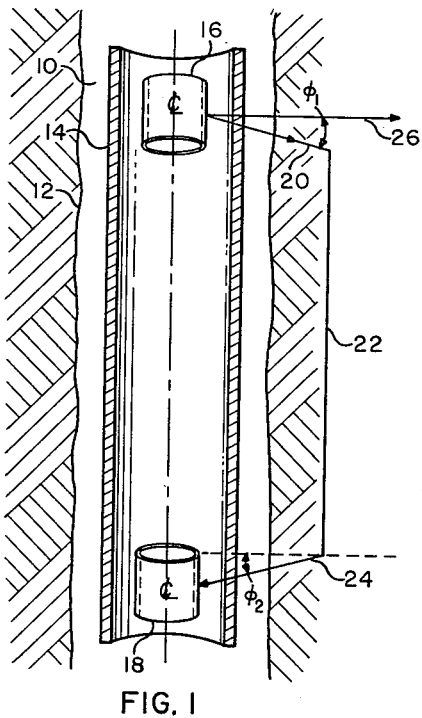

Referring now to FIGURE 1 of the drawings, there is shown a bore hole 10 traversing a section of earth formation 12. Suspended within the bore hole 10 is a tool body 14. Since tools of this type are commonly known, only a section of body 14 is shown. Mounted in spaced apart coaxial relationship within the body 14 are a cylindrical transmitter transducer 16 and a similar receiver transducer 18.

Electrical energy is converted to acoustic energy by transducer 16 which is transmitted through the tool body 14, the bore hole 10 and into the earth strata 12. The pulse then travels through the earth formation as generally shown by ray 20—22—24 and is detected by receiver transducer 18 after having passed back through the bore hole 10 and the tool body 14. The time interval between the emission of an acoustic pulse by transmitting transducer 16 and its subsequent reception by receiver transducer 18, or the pulse velocity which is the reciprocal of the time interval, has been found to be indicative of characteristics of the earth formation.

The usable portion of the pulse produced by transmitter 16 is shown by ray 20—22—24. However, the maximum acoustic energy is expended in the direction of ray 26 since the direction of propagation of a pressure wave is normal to the surface of the source of said wave. Also, the maximum sensitivity of receiver 18 would be to a pressure wave received in parallel to ray 26.

It will be noted that the usable logging signal must cross at least two interfaces before it reaches the receiver 18. These are encountered in going from the bore hole 10 to the formation 12 (ray 20) and in going from the formation 12 to the bore hole 10 (ray 24). The effects of the tool body 14 and mud cake on the bore hole wall are considered negligible. If, as is true in practical logging situations, the velocity of sound in the mud and in the formaton are different, then refraction of the sound must occur in accordance with Snell's law.

Figure 2:
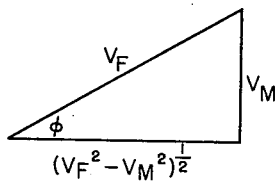
FIGURE 2 is a vector diagram of the mud and formation acoustic velocity.

FIGURE 2 graphically illustrates Snell's law which states:

$$\operatorname{Sin} \phi = \frac{V_\mathrm{M}}{V_\mathrm{F}} \tag{1}$$

where:

$\phi$ is the angle the signal makes with the horizontal;
$V_\mathrm{M}$ is the velocity of sound in the bore hole fluid; and
$V_\mathrm{F}$ is the velocity of sound in the earth formation.

In most practical well logging situations the velocity of sound in the bore hole fluid may be assumed to be substantially constant throughout a well bore while such velocity in the earth formations may vary over a considerable range. For example, the velocity of sound of an average shale may vary from 6,500' per second to 10,000' per second while a very low porosity limestone may yield acoustic velocity values approaching 22,000' per second.

Figure 3:
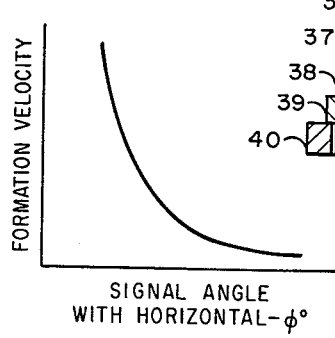
FIGURE 3 is a graph of formation velocity plotted against signal angle with the horizontal.

If the bore hole fluid acoustic velocity is considered constant, then FIGURE 3 illustrates the effect of velocity on the angle that the received signal makes with the horizontal.

As is evident from Equation 1 above, the angle $\phi$ increases as formation velocity $V_F$ reduces. Increases in $\phi$ result in reduced signal strength because of the following effects:

(1) The main energy output of the transmitter transducer is a sound or pressure wave component propagated in a direction perpendicular to the transducer surface. As angle $\phi$ increases, this component reduces with the cosine of $\phi$ such that, at sufficiently reduced formation velocities, the effective component is materially weakened.

(2) Given a sufficiently long cylindrical transducer, e.g., 3.6 inches long, it is evident that with increases in angle $\phi$ the paths various portions of the signal must travel to reach their respective portions of the receiver transducer surface, e.g., portions at either end of the transducer, may be of sufficiently different lengths as to result in total signal cancellation because of the signal portions arriving sufficiently out of phase.

These effects take on increased significance when it is realized that the low velocity formations, which as brought out above cause increases in angle $\phi$, also usually have the highest attenuation effect on the transmitted signal. All these together, of course, tend to compound to weaken the effective signal in the low velocity formations.

In order to aid the weaker signals from the low velocity formations, transducer shapes have been found to give the greatest output for pulse emitting and arrival angles of about 30°. The ideal shape has been found to be of a cone shape with an included cone angle of about 60°.

Figure 4:
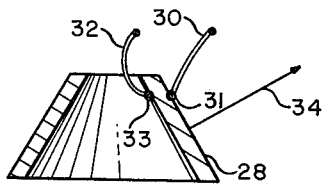
FIGURE 4 shows one construction of an individual transducer.

FIGURE 4 shows a preferred embodiment cast in the form of a hollow truncated cone of an electrostrictive transducer material 28. Leads 30 and 32 are connected to electrodes 31 and 33 plated on the inside and outside surfaces of the cone for purposes of making electrical connections to the transducer. The main energy component would be directed as illustrated by arrow 34.

Figure 6:
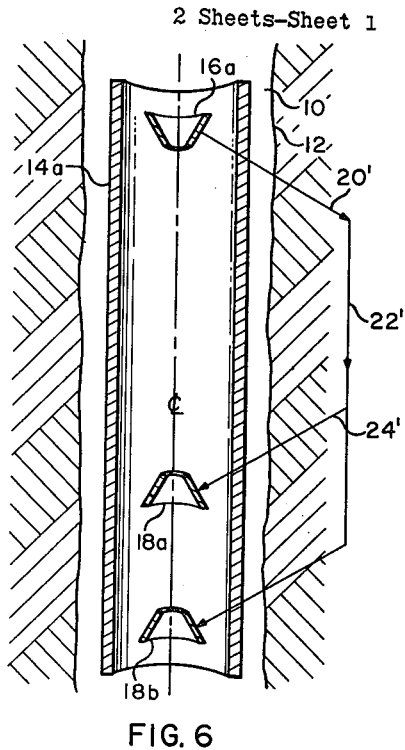
FIGURE 6 shows a typical transducer configuration in a well tool.

A typical configuration for such transducers in a logging tool is illustrated in FIGURE 6. Mounted within a body 14 is a conical transmitter 16a with its large opening upward and in spaced apart coaxial relation with two similar receiver transducers 18a and 18b with their large openings downward. Rays 20'—22'—24' illustrates the direction of main energy propagation of this configuration as opposed to the main energy direction represented by ray 26 of the presently used configuration shown in FIGURE 1.

Transducers 16 and 16a are respectively cylindrical and frusto-conical bodies of revolution which, as indicated by rays 26 and 20', both emanate sound energy principally in a direction perpendicular to the generating element of the respective body (i.e., the surface lines of the transducer body from whence energy rays 26 and 20' are shown to respectively originate) and in a plane including the axis of revolution of the respective body (indicated in both FIGS. 1 and 6 in the drawings by the symbol $\updownarrow$). From this, it is evident that all the main energy output of the cylindrical transducer 16 may be illustrated by a multitude of rays emanating from the entire cylindrical surface similarly to ray 26. It is further evident that this multitude of rays define a propagation zone which may be aptly described as being defined by a pair of parallel planes which are perpendicular to the $\updownarrow$ (FIG. 1) and spaced apart a distance equal to the length of the surface generating element of the cylindrical transducer. Similarly, it is apparent that the main energy output of the conical transducer 16a may be illustrated by a multitude of rays emanating from the entire conical surface similarly to ray 20'. Also, similarly, it is further evident that this latter multitude of rays 20' define a propagation zone which may be aptly described as being defined by first and second concentric cones (not shown) which are, in turn, defined by the locus of all rays 20' emanating respectively from the conical surface of the transducer at either extremity thereof. These zone-defining locus cones are, of course, coaxial with the transducer $\updownarrow$ (FIG. 6).

Stated another way, the principal output zone of the cylindrical transducer is a plane (albeit of some thickness) which is radial to the transducer and perpendicular to the borehole, whereas the principal output zone of the conical transmitter transducer is of cone-in-cone geometry coaxially disposed about the common axis of $\updownarrow$ of the transducer and of the borehole and directed generally toward the associated receiver transducers. From this contrast, it is apparent that the conical transducer 16a in propagating its main energy output more directly toward its associated receivers (18a and 18b) is able to produce a stronger signal at the receiver transducers than a conventional cylindrical transducer which characteristically projects its main energy output in a direction such that much more of its energy content is lost insofar as reception is concerned.

FIGURE 6 represents an acoustic velocity logging system commonly known as the two receiver system. Acoustic energy transmitted from transmitter transducers 16a after passing through the earth strata is received at two coaxial spaced apart receiver transducers 18a and 18b. The acoustic pulse is first received at the transducer nearest the transmitter 18a and subsequently received at the farthest spaced receiver transducer 18b. Suitable signal circuits are provided so that the time interval of pulse travel between the receivers 18a and 18b may be determined. This time interval is a measure of the acoustic energy transmit time through the earth strata between transducer receivers 18a and 18b. It is clear that one or the other of said receiver transducers 18a and 18b may be omitted to provide a single receiver embodiment of the type shown in FIGURE 1.

Figure 5:
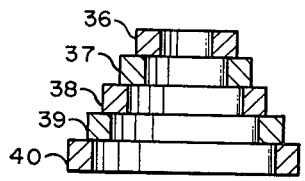
FIGURE 5 shows an alternate construction of an individual transducer.
Figure 5A:
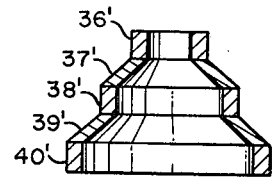
FIGURE 5A shows an alternate embodiment similar to FIGURE 5.

FIGURES 5 and 5A indicate methods of constructing the individual transducers 16a and 18a. In FIGURE 5, concentric rings of electrostrictive material 36, 37, 38, 39 and 40 of varied diameter are provided to form a compound transducer generally equivalent to the integral transducer of FIGURE 4. In FIGURE 5A, concentric rings of electrostrictive material 36', 38' and 40' of unequal diameter interspersed with conical spacers 37' and 39' are provided to form a compound transducer generally equivalent to the integral transducer of FIGURE 4.

It has been found that compound transducers comprised of groups of cylindrical electrostrictive transducers of short axial lengths and equal dimension in electrical connection with small inductances can be provided to cause the voltages appearing across the various transducers to reach maximum values at successive time intervals to enhance their stress and effective energy output. The combined acoustic wave thereby produced at a small distance from the assembly would be the same as that from a cone shaped transducer.

Turning to FIGURE 7, there is seen two hollow cylindrical electrostrictive transducers 42 and 44 separated by distance $d$. If the signal output (or input is to be reinforced at a direction $\phi$ degrees with respect to the horizontal, the signal from the one transducer must be delayed until the wave from the other transducer has traveled through a distance equal to $d \sin \phi$ as shown in FIGURE 8. If the velocity of sound in the fluids surrounding the transducers is $V_M$ inches per second, the travel time required per inch is $$\frac{1}{V_M}$$

seconds per inch. Thus, the delay time ($T_d$) between waves generated by upper transducer 42 and lower transducer 44 of FIGURE 7 is:

$$\left(T_d = \frac{1}{V_M}\right)(d \sin \phi) \text{ seconds} \qquad (2)$$

Then, if a fluid velocity ($V_M$) approximately that of an average drilling mud is assumed to be:

$$V_M = 5,000 \text{ ft./sec.}$$

and a spacing ($d$) between transducers of 2″ is chosen and a signal angle ($\Theta$) with the horizontal of 30° is desired, then:

$$V_M = 5,000 \text{ ft./sec.} = 60,000 \text{ inches/sec.}$$

$$T_d = \frac{1}{60,000} \times 2.0 \sin 30°, \sin 30° = \tfrac{1}{2}$$

$$= \frac{1}{60,000} \text{ sec.} = 16\tfrac{2}{3} \text{ microseconds}$$

The electrical capacitance of electrorestrictive transducers may be readily calculated if the dimensions of the cylinders and the relative dielectric constant are known.

For a hollow cylinder:

$$C = \frac{0.614 \, Er}{\log_{10} \frac{(b)}{a}} \quad (3)$$

where:
$C$=capacitance per inch of length in micro micro farads;
$Er$=relative dielectric constant;
$b$=outside diameter; and
$a$=inside diameter Thus for a transducer one inch in length where:

$Er = 500$
$b = 2.0$ inches
$a = 1.5$ inches
$c = 0.614 \times 500 = 2470$ micro micro farads = .00247 microfarads The relative dielectric constant varies between various transducer materials but may be determined by simple means.

A circuit for pulsing electrostrictive transducers in accordance with this invention is shown in FIGURE 9. The transducers 46, 48 and 50 are initially charged through the resistor 52 from voltage source 51 while thyratron 54 is non-conducting. The application of a positive pulse at the grid 56 of the thyratron 54 ionizes the thyratron, furnishing a low impedance path for discharge of the transducers 46, 48 and 50. Resistor 58 is a small protective resistor to limit peak thyratron currents to a safe value. Inductances 60 and 62 are connected as shown with the transducers 46, 48 and 50 to provide means for delaying the time of firing of each transducer. This delay is a function of the product of the inductance (60 and/or 62) and the capacitance of the transducers (46 and/or 48).

The values of inductances 60 and 62 may be calculated for the desired delay by the equation.

$$T = \sqrt{LC} \quad (4)$$

where:
$C$=capacitance of each transducer in farads;
$L$=inductance of series inductor in henries; and
$T$=desired delay time in seconds
or $$L = \frac{T^2}{C} \text{ henries}$$

for
$C = 2470$ micromicrofarads
$D = 2.0$ inches
$T = 16\tfrac{2}{3}$ microseconds $$L = \frac{(16.67 \times 10^{-6})^2}{2470 \times 10^{-12}} = .1125 \text{ henry}$$

This delay line method may also be employed with magnetostrictive transmitting transducers. A common construction for such magnetostrictive transducers is shown in FIGURE 11 to consist of a core of laminated magnetostrictive material 84 upon which is wrapped a conductor coil 86. Such transducers themselves act as inductances when pulsed by current. The inductances may be calculated by means of the number of turns of conductive wire or tape and the magnetic permeability of the core material.

FIGURE 10 shows an arrangement for reinforcing the output of the small magnetostrictive transducers at the desired angle consisting of a plurality of transducers 64, 66 and 68 connected in series, shunted to ground by capacitances 70 and 72. Thyratron switch 74 is provided, shunting large capacitor 76 which is charged by means of resistor 78 from voltage source 80 to its full capacity while thyratron 74 is non-conductive. Resistor 84 is a small protective resistor to limit peak thyratron currents to a safe value.

Upon appliaction of a positive pulse to grid 82 of thyratron 74, the gas is ionized, furnishing a low impedance path for discharge of the capacitor 76 through the transducers 64, 66 and 68. The flow of current through these transducers causes physical distortions of each transducer core, such as shown at 84 in FIGURE 11, and subsequent emission of acoustic energy. The firing of transducers 64, 66 and 68 is delayed in time one from another in accordance with the square root of the product of the inductance of the transducers to its corresponding capacitor 70 or 72. If the inductive value of the transducers 64, 66 and 68 is known, the delay time between the various transducers may be calculated from simple delay line considerations.

Any combination of inductance and capacitance causes an electrical delay of:

$$T = \sqrt{LC} \text{ microseconds} \quad (4)$$

For each LC section of FIGURE 10 (transducer 64, capacitor 70 or transducer 66 and capacitor 72) the delay between the firings of transducers 64 and 66 may be calculated from the above equation if the inductance value of the transducers and the capacitance of the parallel capacitor is known. Conversely the capacitance required per LC section for a given delay time may be calculated from the known inductances of the magnetostrictive transducers by the equation derived from Equation 3.

$$C = \frac{T^2}{L} \quad (6)$$

where:
$C$=capacitance of parallel capacitors in farads
$L$=inductance of each magnetostrictive transducer
$T$=desired delay time in seconds The arrangements of transducers shown in FIGURES 9 and 10 may be used as receiving transducers in a manner similar to that of a transmitter by taking a signal from terminals 61 or 69 of FIGURES 9 and 10 respectively. Neither the voltage source nor thyrtaron switch is connected to transducer circuits of FIGURES 9 or 10 when the same is used as a receiver.

Turning, for example, to FIGURE 9, transducers 46, 48 and 50 and associated inductances 60 and 62 are connected as shown. A signal received first by transducer 46 is delayed by a time determined by the capacitance of transducer 46 and the inductance 60 then added to the signal received by transducer 48. This combined signal is then delayed by the effects of the capacitance of transducer 48 and inductance 62 and combined with the signal then arriving across transducer 50. This total signal is then connected to suitable amplifier and signal circuits through terminal 61. A similar sequence of events and delays occur in the embodiment shown in FIGURE 10.

By these means the net received signal is reinforced by the component of the signals impinging on the receiver from a preselected angle, without the mutual cancellation as previously described for a single elongated transducer. By the method described above, a novel noise cancellation system has been devised.

It is understood that the illustrative embodiments disclosed herein are susceptible of numerous modifications in form and detail, all falling within the scope of this invention. This invention therefore is to be regarded as being limited only by the scope of the following claims.

That being claimed is:

1. In combination with an acoustic well logging system, a logging tool body, a sound energy transmitting transducer in said body having frusto-conical geometry characterized by having an axis and base and truncated ends, a receiver transducer in said body coaxially disposed with respect to said transmitting transducer and spaced therefrom along said axis in a direction to confront said truncated end.

2. In combination with an acoustic well logging system, a logging tool body, a sound energy receiving transducer in said body having frusto-conical geometry characterized by having an axis and base and truncated ends, a transmitting transducer in said body coaxially disposed with respect to said receiver and spaced therefrom along said axis in a direction to confront said truncated end.

3. In combination with an acoustic well logging system, a logging tool body, a pair of sound energy transducers arranged in said body, said transducers having frusto-conical geometry characterized by having an axis and base and truncated ends, said transducers being coaxially disposed in spaced relation and oriented for the mutual confrontation of their said truncated ends.

4. In combination with an acoustic well logging system, a logging tool body adapted for lowering within a borehole, sound energy transmitter and receiver elements having a common axis and spaced apart therealong in said body, said transmitter elements comprising surface means for projecting a predominant energy component in a wave front sweeping a spacial zone having cone-in-cone boundaries, said zone being coaxial with said axis and extending toward said receiver element, and said receiver element comprising surface means predominantly sensitive to sonic energy components in wave fronts sweeping theretoward through a spacial zone having cone-in-cone boundaries, said zone being coaxial with said axis and extending toward said transmitter element.

5. In combination with an acoustic well logging system, a logging tool body adapted for lowering in a bore hole, a pair of sound energy transducers spaced apart in said body, said transducers having frusto-conical geometry characterized by an axis, a base and a truncated end, said transducers being disposed in coaxial relation and oriented for the mutual confrontation of said truncated ends.

6. In combination with an acoustic well logging system, a logging tool body adapted for lowering in a bore hole, a pair of sound energy transducers spaced apart in said body, said transducers having frusto-conical geometry characterized by an axis, a base and a truncated end, said transducers being disposed in coaxial relation and oriented similarly.

7. In combination with an acoustic well logging system, a logging tool body adapted for lowering in a bore hole, a pair of sound energy transducers spaced apart in said body, said transducers having frusto-conical geometry characterized by an axis, a base and a truncated end, said transducers being disposed in coaxial relation and said geometry being further characterized by having an included angle of substantially 60°.

8. In combination with an acoustic well logging system, a logging tool body adapted for lowering in a bore hole, a pair of sound energy transducers spaced apart in said body, said transducers having frusto-conical geometry characterized by an axis, a base and a truncated end, said transducers being disposed in coaxial relation and comprised of an electro strictive material.

References Cited in the file of this patent

UNITED STATES PATENTS

| | | |
|---|---|---|
| 2,156,052 | Cooper | Apr. 25, 1939 |
| 2,420,864 | Chilowsky | May 20, 1947 |
| 2,438,925 | Krantz | Apr. 6, 1948 |
| 2,708,485 | Vogel | May 17, 1955 |
| 2,825,044 | Peterson | Feb. 25, 1958 |
| 2,834,952 | Harris | May 13, 1958 |